US006872458B1

(12) United States Patent
Rudd et al.

(10) Patent No.: US 6,872,458 B1
(45) Date of Patent: Mar. 29, 2005

(54) BIAXALLY-ORIENTED POLYPROPYLENE FILMS CONTAINING A NON-CRYSTALLIZABLE, AMORPHOUS POLYESTER LAYER, AND METHOD OF MAKING THE SAME

(75) Inventors: David Rudd, Woodstock, IL (US); Brenda Ruf, Orland Park, IL (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 0 days.

(21) Appl. No.: 10/075,683

(22) Filed: Feb. 14, 2002

Related U.S. Application Data

(60) Provisional application No. 60/269,508, filed on Feb. 16, 2001.

(51) Int. Cl.[7] .................. B32B 27/32; B32B 27/30; B32B 27/36; B32B 31/12; B32B 31/16
(52) U.S. Cl. .................. 428/461; 428/457; 428/458; 428/483; 428/515; 428/516; 428/520; 428/522; 428/523; 428/910; 264/280; 264/288.4; 264/289.3; 264/290.2; 156/229; 156/244.11; 156/244.24
(58) Field of Search .................. 428/457, 458, 428/461, 480, 483, 515, 516, 520, 522, 523, 910; 264/280, 288.4, 289.3, 290.2; 156/196, 199, 229, 244.4, 244.24

(56) References Cited

U.S. PATENT DOCUMENTS

| | | | |
|---|---|---|---|
| 3,751,280 A | 8/1973 | Nerurkar et al. | |
| 3,819,773 A | 6/1974 | Pears | |
| 3,911,172 A | 10/1975 | Van Paesschen et al. | |
| 3,988,157 A | 10/1976 | Van Paesschen et al. | |
| 4,001,023 A | 1/1977 | Van Paesschen et al. | |
| 4,086,317 A | 4/1978 | Miyabe | |
| 4,089,997 A | 5/1978 | Van Paesschen et al. | |
| 4,117,193 A | 9/1978 | Tsuchiya et al. | |
| 4,123,278 A | 10/1978 | Van Paesschen et al. | |
| 4,132,552 A | 1/1979 | Van Paesschen et al. | |
| 4,167,593 A | 9/1979 | Dodwell | |
| 4,214,035 A | 7/1980 | Heberger | |
| 4,225,644 A | 9/1980 | Tsuchiya et al. | |
| 4,233,074 A | 11/1980 | Dodwell et al. | |
| 4,233,352 A | 11/1980 | Ono et al. | |
| 4,241,144 A | 12/1980 | Hendy | |
| 4,244,988 A | 1/1981 | Dodwell | |
| 4,287,298 A | 9/1981 | Dodwell | |
| 4,302,505 A | 11/1981 | Heberger | |
| 4,302,506 A | 11/1981 | Heberger | |
| 4,367,112 A | 1/1983 | Park | |
| 4,371,489 A | 2/1983 | McGrail | |
| 4,388,258 A | 6/1983 | Hungerford | |
| 4,391,767 A | 7/1983 | Pears | |
| 4,405,400 A * | 9/1983 | Petersen-Hoj | 156/244.11 |
| 4,410,600 A | 10/1983 | McGrail | |
| 4,457,254 A | 7/1984 | Hungerford | |
| 4,476,189 A | 10/1984 | Posey et al. | |
| 4,481,058 A | 11/1984 | Park | |
| 4,486,483 A | 12/1984 | Caines | |
| 4,493,872 A | 1/1985 | Funderburk et al. | |
| 4,515,863 A | 5/1985 | Caines | |
| 4,525,419 A | 6/1985 | Posey et al. | |
| 4,554,200 A | 11/1985 | Caines | |
| 4,571,363 A | 2/1986 | Culbertson et al. | |
| 4,585,687 A | 4/1986 | Posey et al. | |
| 4,629,657 A | 12/1986 | Gulati et al. | |
| 4,642,263 A | 2/1987 | Culbertson | |
| 4,732,814 A | 3/1988 | Hatada et al. | |
| 4,745,019 A | 5/1988 | Posey et al. | |
| 4,786,560 A | 11/1988 | Crocker | |
| 4,833,026 A | 5/1989 | Kausch | |
| 4,839,338 A | 6/1989 | Marbrow | |
| 4,845,189 A | 7/1989 | Rudd et al. | |
| 4,851,166 A | 7/1989 | Kendall | |
| 4,874,656 A | 10/1989 | Rantanen | |
| 4,880,695 A | 11/1989 | Rudd et al. | |
| 4,923,713 A | 5/1990 | Rudd et al. | |
| 4,924,525 A | 5/1990 | Bartasis | |
| 4,954,396 A | 9/1990 | Swofford et al. | |
| 4,956,241 A | 9/1990 | Chu et al. | |
| 4,981,758 A | 1/1991 | Chu et al. | |
| 5,017,430 A | 5/1991 | Chu et al. | |
| 5,022,944 A | 6/1991 | Swofford et al. | |
| 5,023,120 A * | 6/1991 | Akao | 428/35.9 |
| 5,059,470 A * | 10/1991 | Fukuda et al. | 428/142 |
| 5,077,353 A | 12/1991 | Culbertson | |
| 5,082,730 A | 1/1992 | Takeda et al. | |
| 5,156,904 A | 10/1992 | Rice et al. | |
| 5,166,242 A | 11/1992 | Chu et al. | |
| 5,182,168 A | 1/1993 | Chu et al. | |
| 5,188,867 A | 2/1993 | Chu et al. | |
| 5,192,620 A | 3/1993 | Chu et al. | |
| 5,206,084 A | 4/1993 | Takeda et al. | |
| 5,212,012 A | 5/1993 | Culbertson | |
| 5,212,260 A | 5/1993 | Culbertson | |
| 5,215,817 A | 6/1993 | Chu | |
| 5,275,886 A | 1/1994 | Chu et al. | |
| 5,298,325 A | 3/1994 | Culbertson | |

(Continued)

FOREIGN PATENT DOCUMENTS

| | | | |
|---|---|---|---|
| EP | 0 444 340 | * | 9/1991 |
| EP | 0 782 498 B1 | * | 8/2000 |

*Primary Examiner*—Vivian Chen
(74) *Attorney, Agent, or Firm*—Caesar, Rivise, Bernstein, Cohen & Pokotilow, Ltd.

(57) ABSTRACT

A method of making a multilayer film is provided, including the steps of forming a core layer of a polypropylene film, monoaxially orienting the core layer in a first direction, and providing at least one multilayer cap layer to at least one side of the core layer to provide a multilayer film. The cap layer includes a non-crystallizable, amorphous polyester layer having a sufficient proportion of a non-crystallizable, amorphous polyester to render the amorphous polyester layer non-crystallizable and a first tie layer interposed between the polyester layer and the core layer, the first tie layer including an adhesive. The multilayer film is then oriented in a second direction transverse to the first direction.

26 Claims, No Drawings

U.S. PATENT DOCUMENTS

| | | | |
|---|---|---|---|
| 5,302,327 A | 4/1994 | Chu et al. | |
| 5,302,459 A | 4/1994 | Kim et al. | |
| 5,310,787 A * | 5/1994 | Kutsuwa et al. | 524/513 |
| 5,324,467 A | 6/1994 | Anderson, II | |
| 5,350,601 A | 9/1994 | Culbertson et al. | |
| 5,378,414 A | 1/1995 | Derkach | |
| 5,385,768 A | 1/1995 | Otani et al. | |
| 5,391,429 A | 2/1995 | Otani et al. | |
| 5,424,120 A | 6/1995 | Culbertson | |
| 5,453,326 A | 9/1995 | Siddiqui | |
| 5,496,647 A | 3/1996 | Krejci et al. | |
| 5,525,421 A | 6/1996 | Knoerzer | |
| 5,545,713 A | 8/1996 | Krejci et al. | |
| 5,562,997 A | 10/1996 | Krejci et al. | |
| 5,607,777 A | 3/1997 | Krejci et al. | |
| 5,637,366 A | 6/1997 | Davis et al. | |
| 5,795,649 A | 8/1998 | Cosentino et al. | |
| 5,824,394 A | 10/1998 | Kinoshita et al. | |
| 5,885,703 A | 3/1999 | Wilkie | |
| 5,928,781 A | 7/1999 | Caines et al. | |
| 5,968,664 A | 10/1999 | Heberger et al. | |
| 5,985,437 A | 11/1999 | Chappell, Jr. et al. | |
| 5,998,002 A | 12/1999 | Harada et al. | |
| 6,020,412 A | 2/2000 | Muschelewicz et al. | |
| 6,033,514 A * | 3/2000 | Davis et al. | 156/244.11 |
| 6,060,156 A | 5/2000 | Chappell, Jr. et al. | |
| 6,117,532 A | 9/2000 | Siddiqui et al. | |
| 6,221,191 B1 * | 4/2001 | Davis et al. | 156/150 |
| 6,607,834 B2 * | 8/2003 | Davis et al. | 428/457 |
| 2002/0009605 A1 * | 1/2002 | Davis et al. | 428/461 |

* cited by examiner

BIAXALLY-ORIENTED POLYPROPYLENE FILMS CONTAINING A NON-CRYSTALLIZABLE, AMORPHOUS POLYESTER LAYER, AND METHOD OF MAKING THE SAME

CROSS-REFERENCE TO RELATED APPLICATION

This application claims the benefit of U.S. Provisional Application Ser. No. 60/269,508, filed Feb. 16, 2001, the entire specification of which is hereby fully incorporated by reference.

BACKGROUND OF THE INVENTION

1. Field of the Invention

The invention generally relates to multilayer polyolefin film structures and methods of making the same. More specifically, the invention relates to a biaxially-oriented polypropylene film incorporating a non-crystallizable, amorphous polyester layer.

2. Brief Description of Related Technology

Biaxially-oriented polypropylene (BOPP) films are widely used in packaging because they have good stiffness, strength, optical properties (low haze and high gloss), and moisture barrier properties. Users of packaging films, particularly users of BOPP films, are continually seeking structures with improved printability, metallizing properties, and gas barrier. Because of their olefinic nature, typical BOPP constructions have low surface energy and require treatment (corona, flame, etc.) in order to be printed or metallized. Polyester is known to have high surface energy and possesses excellent printing and metallizing attributes. Additionally, polyester, both in clear and metallized structures, offers improved gas barrier performance as compared to BOPP films. This is especially true in the case of metallized polyester films which are an order of magnitude or more lower in oxygen transmission rate.

Although there has been a long felt need for BOPP films incorporating polyester layers, problems in obtaining acceptable optical and processability characteristics, adequate interply adhesion, and other properties have been encountered in previous attempts to produce polyester-containing BOPP structures. For example, U.S. Pat. No. 5,324,467 discloses a process for the preparation of an oriented multilayer laminate film having at least three layers, including a polypropylene layer, a tie layer, and a copolyester layer. The films are formed by combining the layers in the molten state, either in a coextrusion, or in separate extrusions brought together outside the die (where the film is subsequently cooled, oriented uniaxially or biaxially, and then heat set to lock in the properties). A major problem in producing a structure according to this method on commercial scale equipment is the strong tendency of polyester to adhere to the heated metal rolls of the machine direction orientation section. This makes it difficult to achieve good optical properties free of visual defects and may also decrease other properties such as the seal initiation temperature.

U.S. Pat. No. 4,874,656 describes a multilayer laminate having a high mechanical resistance and an impermeability to gases and vapors. In the disclosed structures, a polyester layer is joined to a polypropylene layer after the polypropylene is biaxially-oriented, the polyester layer is quite thick (12 to 24 microns), and the structure includes a layer of metallic foil and a layer of polyethylene. While joining a polyester layer to a BOPP layer after biaxial orientation is possible, this method is impractical for incorporating thin layers of polyester.

U.S. Pat. No. 4,924,525 also describes a structure wherein a polyester laminate is adhered to a BOPP film after the polypropylene is biaxially oriented. Again, this invention precludes the use of thin polyester layers in the final structure.

U.S. Pat. No. 5,637,366 describes a structure wherein a three-layer polyester-containing cap layer is bonded to a monoaxially oriented polypropylene core, followed by orientation of the resulting composite in a direction transverse to the direction of orientation of the core layer. The '366 patent however teaches that the polyester layer utilizes as a major portion thereof (e.g., >89%), crystalline polyesters, crystallizable amorphous polyester homopolymers, and crystallizable amorphous polyesters, an example of which is described in the '366 patent as a polyethylene terephthalate isophthalate sold by E.I. du Pont de Nemours & Co., Wilmington, Del., under the name SELAR® PT8307. The structure disclosed in the '366 patent can experience seal strength problems in that the cap layer to core seal strength may not be consistently high enough for use of the film in certain applications.

SUMMARY OF THE INVENTION

A method of making a multilayer film is provided which includes the steps of forming a core layer comprising a polypropylene film, monoaxially orienting the core layer in a first direction and providing at least one multilayer cap layer to at least one side of the core layer to provide a multilayer film. The cap film layer includes a non-crystallizable, amorphous polyester layer comprising a sufficient proportion of a non-crystallizable, amorphous polyester to render the amorphous polyester layer non-crystallizable. A first tie layer is interposed between the polyester layer and the core layer, where the first tie layer includes a polyolefin (or other) adhesive. The multilayer cap film is oriented in a second direction transverse to the first direction.

The cap layer may further include a second tie layer interposed between the first tie layer and the core layer. The second tie layer may be a polypropylene copolymer, a terpolymer, or a linear ethylene polymer. The core layer may also include the second tie layer which may be a polypropylene copolymer, a terpolymer, or a linear ethylene polymer.

The cap layer may further include a second tie layer interposed between the first tie layer and the core layer. The second tie layer may be a polypropylene copolymer, a terpolymer, or a linear ethylene polymer. The core layer may also include the second tie layer which may be a polypropylene copolymer, a terpolymer, or a linear ethylene polymer.

The method may further include the step of metallizing an outer surface of the biaxially-oriented multilayer film opposite the polyester layer.

The non-crystallizable, amorphous polyester may be a glycolized polyethylene terephthalate, a cyclohexane dimethanol polyester soaked in diethylene glycol, or a mixture thereof.

The polyester layer preferably comprises at least about 50% by weight of a non-crystallizable, amorphous polyester, based on the total weight of the polyester layer. More preferably, the polyester layer may comprise at least about 70% by weight of a non-crystallizable, amorphous polyester, based on the total weight of the polyester layer. More preferably still, the polyester layer may comprise at least about 90% by weight of a non-crystallizable, amorphous polyester, based on the total weight of the polyester layer. More preferably still, the polyester layer may comprise at least about 95% by weight of a non-crystallizable, amorphous polyester, based on the total weight of the polyester layer. Most preferably, the polyester layer may comprise at least about 99% by weight of a non-crystallizable, amorphous polyester, based on the total weight of the polyester layer.

The core layer may further comprise at least one incompatible inorganic mineral in an amount sufficient to render the core substantially opaque. The inorganic mineral may be titanium dioxide, aluminum oxide, zinc oxide, calcium sulfate, barium sulfate, calcium carbonate, magnesium carbonate, silica, sodium silicate, aluminum silicate, mica, clay, talc. These inorganic minerals may be present in the core layer in a concentration in a range of about 2 wt. % to about 25 wt. %.

The multilayer film may contain at least one additive consisting of antioxidants, lubricants, surfactants, antistats, slip agents, antiblock agents, nucleating agents, coupling agents, coated minerals, pigments, or dyes.

The polypropylene film of the core layer may be coextruded between two second tie layers. The polypropylene film of the core layer may contain at least one incompatible inorganic mineral in an amount sufficient to render the core layer substantially opaque. At least one of second tie layers may contain at least one incompatible inorganic mineral in an amount sufficient to enhance the opacity of the core layer. This inorganic mineral may contain titanium dioxide and may also contain a cavitating mineral. The cavitating mineral may be calcium carbonate.

The polypropylene film may be substantially free of incompatible inorganic minerals. Here, at least one of the two second tie layers may contain at least one incompatible inorganic material in an amount sufficient to render the core layer substantially opaque. This inorganic material may be titanium dioxide. The second tie layer that contains titanium dioxide may also contain a cavitating mineral. The cavitating mineral may be calcium carbonate. At least one outer surface of the multilayer film may be metallized.

The first tie layer may comprise an adhesive of copolymers of ethylene with at least one carboxylic acid or carboxylic acid anhydride, or terpolymers of ethylene, an ester, and a carboxylic acid or carboxylic acid anhydride. The ester may consist of vinyl acetate, methyl acrylate, butyl acrylate, ethyl acrylate, or partially hydrolyzed ester derivatives. The carboxylic acid or carboxylic acid anhydride may be acrylic acid, methacrylic acid, maleic acid, or maleic anhydride. The first tie layer may be an ethylene-acrylic acid copolymer. The terpolymer may be an ethylene-ester copolymer modified with a carboxylic acid or carboxylic acid anhydride. The terpolymer may also be an ethylene-ester copolymer backbone grafted with a carboxylic acid or carboxylic acid anhydride. The adhesive may be a terpolymer, wherein the ethylene, the ester, and the carboxylic acid or acid anhydride are incorporated in a main chain of the terpolymer.

The cap film may be free of a silicone fluid.

The present invention is also directed to a multilayer film that includes a core layer having a polypropylene film monoaxially oriented in a first direction and at least one multilayer cap film provided on the core layer to provide a multilayer film. The cap film includes a non-crystallizable, amorphous polyester layer to render the amorphous polyester layer non-crystallizable and a first tie layer interposed between the polyester layer and said core layer. The first tie layer includes an adhesive. The multilayer film is oriented in a second direction transverse to the first direction.

Finally, a biaxially oriented multilayer film is disclosed which has a core layer having a polyolefin film, a non-crystallizable, amorphous polyester layer including a sufficient proportion of a non-crystallizable, amorphous polyester to render the amorphous polyester layer non-crystallizable, and at least one tie layer interposed between the core and polyester layers.

Further features of the invention may become apparent to those skilled in the art from a review of the following detailed description, taken in conjunction with the appended claims. Described hereinafter are specific embodiments of the invention with the understanding that the present disclosure is intended as illustrative, and is not intended to limit the invention to the specific embodiments described herein.

DETAILED DESCRIPTION OF THE PREFERRED EMBODIMENTS

The invention addresses various concerns of the prior art by providing a film structure that positions a non-crystallizable, amorphous polyester at the outer layer of the film, thereby taking advantage of the improved printability and metallizing attributes of polyesters. This film structure also eliminates the difficulty of contacting polyester on the heated rolls of the machine direction orienter. Finally, the film provides thin polyester layers that allow a structure of economic value to be produced. An additional benefit of the invention is that a broad range of polyester products, including amorphous homopolymer grades, may be included in the inventive film structures. This allows the designer a wide choice in making films with improved optical properties, printability, and metallizing attributes as well as stiffness and heat resistance.

The films of the present invention provide excellent barrier to flavors and aromas. Moreover, since the polyester layer of the inventive film is formed from an extruded high molecular weight polymer, there is no cracking or abrasion and, consequently, no loss in film integrity. Furthermore, BOPP films, with an external, non-crystallizable, amorphous polyester layer, can be readily printed or metallized, or adhesively coated on the polyester surface. Also, the film surface opposite the polyester side can be metallized, leaving the polyester layer available for other modifications. It has been found that the use of a non-crystallizable, amorphous polyester, as opposed to use of crystallizable polyesters (such as the crystalline polyesters, crystallizable amorphous polyester homopolymers, and crystallizable amorphous polyesters disclosed in the U.S. Pat. No. 5,637,366 patent, cited above), provides the film with superior cap layer-to core seal strength characteristics (e.g., strength and consistency) not found in the prior art. Accordingly, preferably, a major portion of the polyester layer forming the cap layer of the film is a non-crystallizable, amorphous polyester, which is described in further detail below.

Generally, the polyester-containing BOPP film of the invention includes a core layer and a multilayer outer film (cap layer) or film adhered to at least one surface of the core layer. The multilayer BOPP film of the invention is prepared using interdraw coating or lamination techniques. For purposes of the present application, the term "coating" is intended to include both coating and laminating.

The BOPP core layer comprises a layer of polypropylene and, in one embodiment, further comprises one or more tie layers, as described below.

The cap layer is applied on one or both surfaces of the monoaxially oriented core layer. The cap layer comprises a layer of a non-crystallizable, amorphous polyester resin and at least one tie layer. The tie layer is disposed between the polyester layer and the core layer.

The cap layer may include a second tie layer comprising a polypropylene copolymer or terpolymer or linear ethylene polymer interposed between the first (adhesive) tie layer and the core layer. In a variation on this embodiment, the second tie layer forms part of the core layer, and is positioned adjacent the adhesive first tie layer in the final structure. This second tie layer may be oriented with the polypropylene layer of the core layer.

The multilayer BOPP film of the invention is prepared by the steps of forming and orienting the core layer in a first direction, providing the cap layer to at least one side of the monoaxially oriented core layer to form a multilayer film, and then orienting the resulting multilayer film in a second direction transverse (and preferably perpendicular) to the first direction to provide a biaxially-oriented multilayer film.

The biaxially-oriented multilayer film may then be subjected to a heat setting treatment to allow the film to crystallize. In a preferred embodiment, an outer surface of the polyester layer and/or an outer surface of the multilayer film opposite the polyester layer is metallized.

The invention is described in more detail below.

Core Layer Structure

As stated above, the core layer may be a polypropylene monolayer or may comprise a multilayer structure including a core layer of a polypropylene with a (second) tie layer on one or both sides of the core layer.

The term "polypropylene" as used herein with reference to the core layer generically denotes a semi-crystalline polymer with a majority of polymerized propylene, and specifically includes isotactic homopolymers of propylene, copolymers of propylene with up to 25 weight percent ethylene or butene, terpolymers of propylene with ethylene and butene, and mixtures thereof.

Preferred polypropylenes are those selected from propylene homopolymers and copolymers of propylene with less than three weight percent comonomer such as ethylene or butene. Melt flow rates of 1 dg/min. to 15 dg/min., and preferably from 1.5 dg/min. to 6 dg/min., as measured according to ASTM D1238-90b, Condition 230/2.16 (formerly Condition F) are suitable for sheet or blown film.

The thickness of the core layer is limited only as dictated by oriented polypropylene tenter process limitations, and typically will range from about 12 microns to about 50 microns.

The core layer may optionally include the second tie layer or layers. The second tie layers are polyolefin layers and may comprise a polypropylene copolymer or terpolymer or a linear ethylene polymer coextruded with the polypropylene core layer. While the polypropylene core layer may be a homopolymer, the coextruded second tie layer may comprise a copolymer of propylene with up to 25 weight percent of ethylene or butene, mixtures thereof, or a linear ethylene polymer such as linear low density polyethylene (LLDPE). The thickness of the total core layer structure is limited only by the tenter process limitations, as described above, and thus is typically about 12 microns to about 50 microns thick. The thickness of an individual coextruded second tie layer is typically about 0.5 microns to about 2 microns thick.

One important class of BOPP films are white, pigmented films used in packaging applications. For example, confectionery goods are frequently packaged with white BOPP films because the films provide a light barrier to prevent premature spoilage initiated by UV light and the fact that white films present a clean, appealing surface.

For white film versions made in accordance with the present invention, the clear film core layer structure is modified by the addition of incompatible inorganic minerals. An especially important mineral is titanium dioxide, $TiO_2$, the most commonly used white pigment. Typical $TiO_2$ concentration range in the core layer is about one weight percent to about 20 weight percent. Thicker films require less $TiO_2$ to attain the same whiteness. For the inventive films, the preferred concentration range is about four weight percent to about 15 weight percent.

Other minerals that may be used are aluminum oxide, zinc oxide (ZnO), calcium sulfate, barium sulfate, calcium carbonate (e.g., chalk), magnesium carbonate, sodium silicate, aluminum silicate, silicon dioxide (i.e., $SiO_2$ or silica), mica, clay, talc, and the like, in a range of about 2 weight percent to about 25 weight percent in the core layer. The action of these minerals is to cause formation of cavities or voids in the film. These cavities contribute to making the film more opaque due to multiple light scattering. The concentration of the minerals and their particle sizes help determine the void structure and several film properties.

Other additives can be used, such as antioxidants, lubricants, surfactants, antistats, slip agents, antiblock concentrates or agents, nucleating agents, coupling agents, and coated minerals. Similarly, addition of pigments and dyes (inorganic and organic) to the core layer or encapsulating coextruded layers of the white versions can yield colors other than white.

Addition of the minerals may be accomplished by using a separate feed stream of a mineral into the extruder that produces the core polypropylene melt layer, or by initially blending a dry mix of the mineral and polypropylene and then extruding the mixture, or by masterbatch concentrate. Masterbatch concentrates of the minerals in polypropylene are first melt compounded. These concentrates are then separately added to the core extruder feed with the polypropylene.

In one embodiment, the white film core structure comprises three coextruded layers.

The center layer (typically 10 microns to 50 microns in thickness), is encapsulated by two outer coextruded polyolefin (second tie) layers. These are typically 0.5 microns to 5 microns thick encapsulating layers and provide continuous non-porous layers. Minerals may be contained in any of the core layers. In one form, the center layer contains the whitening minerals, and the encapsulating layers may contain TiO, to enhance the whitening power. In another version, these encapsulating layers may contain $TiO_2$ and cavitating minerals such as calcium carbonate (i.e., $CaCO_3$), for example, whereas the middle layer is free of $TiO_2$, or other minerals.

If desired, a white film may have a metallized outer surface on an outer surface of the polyester layer and/or an outer surface of the multilayer film opposite the polyester layer.

Cap Layer

The cap layer (or film) comprises a two-layer film, including an outer, non-crystallizable, amorphous polyester layer, and a first tie layer comprising a polar or grafted olefin polymer adhesive. The cap layer also may comprise a three-layer film that includes, in addition to the two-layer film, a second tie layer comprising a copolymer of propylene with up to 25 weight percent of ethylene or butene, a terpolymer of propylene, ethylene, adhesive, mixtures thereof, or a linear ethylene polymer, such as LLDPE. When this second tie layer is present in the cap layer, the first tie layer is interposed between the polyester layer and second tie layer.

The non-crystallizable, amorphous polyester layer comprises a sufficient proportion of non-crystallizable, amorphous copolyester or polyester homopolymer to render the amorphous polyester layer non-crystallizable. The terms "non-crystallizable" and "amorphous" generally describe the solid state structure of the polyester as supplied by the vendor and prior to orientation. More specifically, however, the term "non-crystallizable," as it is used herein to describe the polyester layer, refers to the crystallization half-time of the polyester layer. Akin to radioactivity half-lives, the crystallization half-time of a material is the time required for one-half of the material to become crystal. For the purpose of the invention, a crystallizable material has a crystallization half-time of less than about twenty minutes, more likely less than about one minute. In contrast, a non-crystallizable material has a crystallization half-time of greater than about one hour, more likely greater than about two thousand hours. Accordingly, a non-crystallizable, amorphous polyester layer means the layer contains a sufficient proportion of copolyester or polyester homopolymer having a crystallization half-time greater than about one hour to render the entire layer non-crystallizable.

In a preferred embodiment of the present invention, the non-crystallizable, amorphous polyester is present in the polyester layer in an amount of at least about 50% by weight, based on the total weight of the polyester layer, more preferably, at least about 70% by weight, based on the total weight of the polyester layer, and even more preferably, at least about 90% by weight, based on the total weight of the polyester layer. In a highly preferred embodiment of the invention, the non-crystallizable, amorphous polyester is present in the polyester layer in an amount of at least about 95% by weight, based on the total weight of the polyester layer. In an even more highly preferred embodiment of the invention, the non-crystallizable, amorphous polyester is present in the polyester layer in an amount of at least about 99% by weight, based on the total weight of the polyester layer.

By the term "copolyester" it is meant that the polyester is the reaction product of at least one polyol and one carboxylic acid, with there being a total of at least three monomers selected from the polyols and acids. "Homopolymer" polyesters are understood to include a single polyol and a single acid moiety.

Non-crystallizable, amorphous polyesters suitable for use in the invention include those having a glass transition temperature (Tg) in a range of about 131° F. (55° C.) to about 189° F. (87° C.) as determined by differential scanning calorimetry. Preferred non-crystallizable, amorphous polyesters include, but are not limited to, a glycolized polyethylene terephthalate (PETG) (such as EASTAR® PETG Copolyester 6763), a cyclohexane dimethanol polyester soaked in diethylene glycol (such as EASTAR® PETG 5445), and mixtures thereof. Both of the EASTAR® products are commercially-available from Eastman Chemical Co., Kingsport, Tenn. Other non-crystallizable, amorphous polyesters sold by Eastman Chemical Co. also can be used in accordance with the invention. A particularly preferred non-crystallizable, amorphous polyester includes about 97% EASTAR® PETG Copolyester 6763 and about 3% Eastman C0047.

The first (adhesive) tie layer adhered to the polyester layer may comprise, for example, a copolymer of ethylene with an ester such as an ethylene/vinyl acetate copolymer, or, for example, an ethylene/methyl acrylate copolymer, an ethylene/n-butyl acrylate copolymer, an ethylene/ethyl acrylate copolymer, or an ethylene methacrylic acid (EMAA or EMAC for short). For example, a particularly desirable first tie layer would include 100% Eastman EMAC SP2260. Ionomers (partially hydrolyzed ester derivatives) are also suitable as adhesive tie layer candidates. Alternatively, the first tie layer may comprise a grafted polyolefin adhesive, such as a polyethylene or polypropylene backbone grafted with at least one ethylenically unsaturated carboxylic acid, carboxylic acid anhydride, or other derivative, as known in the art.

The second tie layer or layers preferably comprise an ethylene/propylene copolymer or terpolymer or a linear ethylene polymer such as LLDPE, as described above. Suitable terpolymers may have the ethylene, ester, and acid or anhydride incorporated into a main chain of the polymer, or may comprise an ethylene/ester copolymer grafted with the acid or anhydride. A particularly desirable second tie layer would include about 96.6% PP Copolymer (Exxon PD9302E1) plus about 3.4% Ampacet 400880.

Either of the first and second tie layers may be a copolymer of ethylene and a carboxylic acid or carboxylic acid anhydride, or a terpolymer of ethylene, an ester, and a carboxylic acid or carboxylic acid or anhydride. Suitable carboxylic acids and carboxylic acid anhydrides include, but are not limited to acrylic acid, methacrylic acid, and maleic acid or maleic anhydride (the latter generally used as grafting monomers).

Preferred adhesives include maleic anhydride modified ethylene-vinyl acetate, such as BYNEL® E418 adhesive resin available from DuPont, and ESCOR® ATX 325 acid terpolymer available from Exxon Chemical, which is an ethylene-based resin having both ester and acrylic acid functionality.

The respective thicknesses of the polyester layer, first tie layer, and second tie layer (when present) may vary within wide ranges, and are substantially independent of each other. Typical approximate thicknesses for the polyester, first tie layer, and second tie layer in the final film are shown in Table 1:

TABLE 1

| LAYER | THICKNESS (Microns) |
| --- | --- |
| Polyester | 0.75 to 2.5 |
| First Tie | 0.5 to 2.5 |
| Second Tie | 0.25 to 1.5 |

Preferably, the total thickness of the cap layer is in the range of about 1.5 microns to about 6.5 microns in the final film.

The cap layer may be formed by any suitable process, including blown or cast film coextrusion, as desired.

Although no further additives to the polyester layer are necessary, suitable antiblock concentrates or agents, such as zeolites, may be advantageously used. Other silicates, clays, talcs, and silicas are suitable antiblock concentrates or agents, and the antiblock concentrates or agents are generally used in a concentration of about 500 to about 10,000 ppm, preferably about 500 to about 1500 ppm, based on the weight of polyester.

The polyester layer may but need not include a silicone fluid (a dimethyl polysiloxane or equivalent), as a processing fluid. Such a fluid preferably has a high molecular weight (e.g., having a viscosity in a range of about 300,000 centipoise (cps) to about 2,000,000 cps, highly preferably about 1,000,000 cps as measured by a Brookfield viscometer). The silicone may be useful in imparting uniform stretching characteristics to the polyester layer. A polyester layer intended for subsequent metalization may contain about 1,000 ppm to about 3,000 ppm silicone fluid based on the weight of the polyester in the polyester layer. A polyester layer not intended for metalization may contain higher concentrations of silicone fluid. The silicone fluid may be added to the polyester by intensive mixing (for example in a Henschel mixer) with pellets of polyester resin in order to coat the pellets, followed by drying of the coated pellets, and extrusion.

Other additives, particularly stabilizers, may be used to protect the cap layer from degradation during processing, or to impart other desired attributes to the final film.

Preparation of Multilayer Bopp Film

The polyester-containing cap layer is added to the core layer by interdraw coating or lamination. Examples of interdraw coating or lamination processes are disclosed in U.S. Pat. No. 5,156,904 to Rice et al., the disclosure of which is incorporated herein by reference. In this method, the core layer is formed by extruding and casting the polypropylene core, orienting the core layer in a first ("machine") direction, forming the polyester-containing outer films, providing the cap layer on one or both sides of the oriented core layer to produce a monoaxially oriented multilayer film, and orienting the resulting multilayer film in a second direction transverse (and preferably perpendicular) to the first direction.

In practice, a monolayer core or a coextruded laminate of the core polypropylene and a propylene copolymer or terpolymer or linear polyethylene tie layer may be cast onto a roll maintained at a temperature in the range of, for example, 10° C. to 100° C., reheated over rolls heated to a temperature (e.g., 100° C. to 204° C.) high enough to soften the polymer (s) in the core yet below the melting point of the propylene polymer thereof, and then oriented in the machine direction. After the subsequent addition of the cap layer(s), the resulting film is reheated to a temperature preferably higher than the softening point of the outer film layers (e.g., 73° C.) and somewhat below the melting point of the core polypropylene (e.g., 150° C. to 165° C.), and the film is oriented in a second direction transverse (and preferably perpendicular) to the machine direction.

The cap layer may be applied to one or both sides of the core layer. Similarly, the core layer may contain a propylene copolymer or terpolymer or linear ethylene polymer second tie layer on one or both sides of the polypropylene core layer. The multilayer BOPP structure may, but need not be, symmetrical. For example, a two-layer cap layer may be disposed on one side of the core layer with a three-layer cap layer disposed on the other side of the core layer.

The following non-limiting examples illustrate the practice and benefits of the invention.

EXAMPLES

All the films described in the following examples were produced in a sequential orientation process. In this process, the core layer was extruded and formed into a sheet prior to machine direction orientation. The core layer was then oriented approximately 500%. The cap layers were adhered to the core layer and the resulting multilayer film was fed into a tenter oven where the film was transverse oriented approximately 900%, heat set, cooled, and wound onto a roll. The initial thickness of the core layer in all the examples was approximately 1650 microns. The thickness after machine direction orientation was 330 microns. The cap layer thicknesses (before tentering) was about 25 microns. The thickness of the final films (after tentering) was about 40 microns. The core layers were produced using Montell PP homopolymer PDC 1188. Other film grade polypropylene resins are suitable for use as the core layer in the experiments described.

Sample Evaluation Methodology

Several films made according to the invention were evaluated for the key attributes listed below. Since an intended use of the films is for packaging, either alone or in laminations, the films should exhibit good appearance, sealability, and integrity. In addition, economic considerations dictate that the films process readily with broad process capability and low waste.

Visual Criteria

All the clear films were rated for haze and optical defects. Haze is measured according to ASTM D-1003. Rating criteria for visual criteria are shown in Table 2.

TABLE 2

| RATING | COMMENTS |
| --- | --- |
| Excellent | Haze < 2, minimal optical defects |
| Good | Haze < 3, minor optical defects |
| Fair | Haze < 5, some optical defects |
| Poor | Haze > 5 |

Polyester Layer Seal Strength (PET/PET Seals)

All the clear (i.e., unmetallized) films were evaluated for (PET/PET) seal strength by cutting one-inch wide strips and sealing the polyester surface to itself at 260° F. (126.7° C.) on a Senecorp Systems 24-inch heat sealer equipped with a flat jaw, using a 0.5 second dwell time and 20 psi of applied pressure. The seals are pulled on an Instron testing machine. The peak value in grams/inch (g/in) was noted and the mode of failure was determined by visual inspection. Rating criteria for polyester layer seal strength (pet/pet seals) are shown in Table 3.

TABLE 3

| Rating | Comments |
| --- | --- |
| Excellent | Seal strength > 500 g/in |
| Good | Seal strength > 200 g/in |
| Fair | Seal strength < 200 g/in |
| Poor | No seal |

Polyester Layer Seal Strength (PET/Paper Seals)

All films were evaluated for PET/Paper seal strength by cutting two-inch wide strips and sealing the polyester surface to paper at 420° F. (215.5° C.) on a Senecorp Systems 12-inch heat sealer equipped with a flat jaw, using a 1.5 second dwell time and 90 psi of applied pressure. The seals were pulled by hand and visually evaluated for paper fiber tearing. Rating criteria for polyester layer seal strength (PET/Paper seals) are shown in Table 4.

TABLE 4

| RATING | COMMENTS |
| --- | --- |
| Excellent | Paper fiber tear across entire seal area |
| Good | Paper fiber tear across > 75% of seal area |
| Fair | Paper fiber tear across < 75% of seal area |
| Poor | No seal and/or paper tear |

Processability

This is a broad category that includes aspects of preparing the cap layer, adhering the cap layer to the core layer, stretching the combined films, and processing through subsequent operations. Rating criteria for processability are shown in Table 5.

TABLE 5

| RATING | COMMENTS |
| --- | --- |
| Excellent | Broad process window, strong adhesion, readily stretches, good winding characteristics, good converting properties |
| Good | Narrower process window, good adhesion, good stretching, winding and converting characteristics |
| Fair | Narrow process window, adequate adhesion, stretches under optimal conditions (some stretching bands evident), adequate converting properties |
| Poor | Difficult to process, inconsistent adhesion, nonuniform stretching characteristics. |

Examples 1–5

Five different cap layers were prepared and adhered to the core layer and the resulting multilayer film was fed into a tenter oven where the film was transverse oriented approximately 900%, heat set, cooled, and wound onto a roll. The initial thickness of the core layer in all the examples was approximately 1650 microns. The thickness after machine direction orientation was 330 microns. The cap layer thicknesses (before tentering) was about 25 microns. The thickness of the final films (after tentering) was about 40 microns. The core layers were produced using Montell PP homopolymer PDC 1188. The composition of each of the cap layers are described as follows in Table 6. Evaluations of each film is presented in Table 7 entitled "Summary of Results" following the descriptions of the composition of each cap layer.

TABLE 6

| CAP LAYER OF EXAMPLE | POLYESTER LAYER | FIRST TIE LAYER | SECOND TIE LAYER |
| --- | --- | --- | --- |
| 1 | 97% Eastman Eastar PETG Copolyester 6763 and 3% Eastman C0005 | 100% Eastman EMAC SP2260 | 96.6% PP Copolymer PP9852E1 and 3.4% Ampacet 400880 |
| 2 | 97% Eastman Eastar PETG Copolyester 6763 and 3% Eastman C0047 | 100% Eastman EMAC 5P2260 | 96.6% PP Copolymer PP9852E1 and 3.4% Ampacet 400880 |
| 3 | 95% Eastman Eastar PETG Copolyester 6763 and 5% Eastman C0047 | 100% Eastman EMAC SP2260 | 96.6% PP Copolymer PP9852E1 and 3.4% Ampacet 400880 |
| 4 | 93% Eastman Eastar PETG Copolyester 6763 and 7% Eastman C0047 | 100% Eastman EMAC SP2260 | 96.6% PP Copolymer PP9852E1 and 3.4% Ampacet 400880 |
| 5 | 97% Eastman Eastar PETG Copolyester 6763 and 3% Eastman C0030 | 100% Eastman EMAC SP2260 | 96.6% PP Copolymer PP9852E1 and 3.4% Ampacet 400880 |

In the Table 6, Eastman EASTAR® PETG Copolyester 6763 is a non-crystallizable, amorphous polyester. Eastman C0047®, Eastman C0005®, and Eastman C0030® generally are antiblock concentrates. More specifically, Eastman C0005® is a concentration of amorphous silica in a polyester resin carrier, Eastman C0047® is a concentration of microcrystalline silica in a polyester resin carrier; and Eastman C0030® is a concentration of microcrystalline silica and fatty acid amide in a polyester resin carrier. Eastman EMAC SP 2260® is an ethylene methacrylic acid. Each of these materials is commercially-available from Eastman Chemical Co., Kingsport, Tenn. The PP Copolymer PP9852E1 is a polypropylene copolymer commercially-available from Exxon-Mobil Corporation. AMPACET® 400880 is an antiblock concentrate commercially-available from Ampacet Corporation, Tarrytown, N.Y.

Evaluations of each film is shown in Table 7.

TABLE 7

SUMMARY OF RESULTS

| EXAMPLE | VISUAL RATING | SEAL STRENGTH (PET/PET) | SEAL STRENGTH (PET/PAPER) | PROCESS-ABILITY |
| --- | --- | --- | --- | --- |
| 1 | Good | Good | Excellent | Excellent |
| 2 | Good | Good | Excellent | Excellent |
| 3 | Good | Good | Excellent | Excellent |
| 4 | Good | Good | Excellent | Excellent |
| 5 | Good | Good | Excellent | Excellent |

All films produced from these cap layer structures exhibited excellent processability and good optics. Furthermore, all films produced from these cap layer structures exhibited good seal strength to themselves, and excellent seals to the paper.

It has further been determined that a cap layer constructed with a polyester layer of 97% Eastman Eastar PETG Copolyester 6763 plus 3% Eastman C0047, a first tie layer of 100% Eastman EMAC SP2260, and a second tie layer of 96.6% PP Copolymer Exxon PD 9302E1 plus 3.4% Ampacet 400880 is the most desirable structure. Here, the Exxon PD9302E1 has a higher melt flow rate (MFR) and ethylene content (3.5% MFR, 4% ethylene) than the 9852E1 (~2MFR, ~2% ethylene), and may be laminated at a lower temperature between the draws of the tenter line.

From the foregoing detailed description, it will be apparent to those skilled in the art that the invention provides useful biaxially-oriented polypropylene film composites containing three-layer polyester-containing cap layer using non-crystallizable, amorphous polyesters.

The foregoing description is given for clearness of understanding only, and no unnecessary limitations should be understood therefrom, as modifications within the scope of the invention may be apparent to those skilled in the art.

We claim:

1. A method of making a multilayer film, comprising the steps of:
   (a) forming a core layer comprising a polypropylene film;
   (b) monoaxially orienting the core layer in a first direction;
   (c) providing at least one multilayer cap layer to at least one side of the core layer to provide a multilayer film, the cap layer comprising:
       (i) a non-crystallizable, amorphous polyester layer comprising a sufficient proportion of a non-crystallizable, amorphous polyester to render the amorphous polyester layer non-crystallizable;
       (ii) a first tie layer interposed between the polyester layer and the core layer, the first tie layer comprising an adhesive; and,
   (d) orienting the multilayer film in a second direction transverse to the first direction.

2. The method of claim 1, wherein the cap layer further comprises a second tie layer interposed between the first tie layer and the core layer, the second tie layer comprising a polymer selected from the group consisting of a polypropylene copolymer, a terpolymer, and a linear ethylene polymer.

3. The method of claim 1, wherein the core layer further comprises a second tie layer interposed between the first tie layer and the core layer, the second tie layer comprising a polymer selected from the group consisting of a polypropylene copolymer, a terpolymer, and a linear ethylene polymer.

4. The method of claim 1, further comprising the step of metallizing an outer surface of the biaxially-oriented multilayer film opposite the polyester layer.

5. The method of claim 1, wherein the non-crystallizable, amorphous polyester is a polyester selected from the group consisting of a glycolized polyethylene terephthalate, a cyclohexane dimethanol polyester soaked in diethylene glycol, and a mixture of a glycolized polyethylene terephthalate and a cyclohexane dimethanol polyester soaked in diethylene glycol.

6. The method of claim 1, wherein the polyester layer comprises at least about 50% by weight of a non-crystallizable, amorphous polyester, based on the total weight of the polyester layer.

7. The method of claim 1, wherein the polyester layer comprises at least about 70% by weight of a non-crystallizable, amorphous polyester, based on the total weight of the polyester layer.

8. The method of claim 1, wherein the polyester layer comprises at least about 90% by weight of a non-crystallizable, amorphous polyester, based on the total weight of the polyester layer.

9. The method of claim 1, wherein the polyester layer comprises at least about 95% by weight of a non-crystallizable, amorphous polyester, based on the total weight of the polyester layer.

10. The method of claim 1, wherein the polyester layer comprises at least about 99% by weight of a non-crystallizable, amorphous polyester, based on the total weight of the polyester layer.

11. The method of claim 1, wherein the core layer further comprises at least one incompatible inorganic mineral in an amount sufficient to render the core substantially opaque.

12. The method of claim 11, wherein the inorganic mineral is an inorganic mineral selected from the group consisting of titanium dioxide, aluminum oxide, zinc oxide, calcium sulfate, barium sulfate, calcium carbonate, magnesium carbonate, silica, sodium silicate, aluminum silicate, mica, clay, and talc.

13. The method of claim 11, wherein the inorganic mineral is an inorganic mineral selected from the group consisting of aluminum oxide, zinc oxide, calcium sulfate, barium sulfate, calcium carbonate, magnesium carbonate, silica, sodium silicate, aluminum silicate, mica, clay, and talc and is present in the core layer in a concentration in a range of about 2 wt. % to about 25 wt. %.

14. The method of claim 1, wherein the multilayer film contains at least one additive selected from the group consisting of antioxidants, lubricants, surfactants, antistats, slip agents, antiblock agents, nucleating agents, coupling agents, coated minerals, pigments, and dyes.

15. The method of claim 1, wherein the polypropylene film of the core layer is coextruded between two second tie layers.

16. The method of claim 15, wherein the polypropylene film of the core layer contains at least one incompatible inorganic mineral in an amount sufficient to render the core layer substantially opaque.

17. The method of claim 16, wherein at least one of the two second tie layers contains at least one incompatible inorganic mineral in an amount sufficient to enhance the opacity of the core layer.

18. The method of claim 17, wherein at least one of the two second tie layers contains titanium dioxide.

19. The method of claim 18, wherein the at least one of the two second tie layers that contains titanium dioxide also contains a cavitating mineral.

20. The method of claim 19, wherein the cavitating mineral is calcium carbonate.

21. The method of claim 15, wherein at least one outer surface of the multilayer film is metallized.

22. The method of claim 1, wherein the first tie layer comprises an adhesive selected from the group consisting of copolymers of ethylene with at least one carboxylic acid or carboxylic acid anhydride and terpolymers of ethylene, an ester, and a carboxylic acid or carboxylic acid anhydride.

23. The method of claim 22 wherein the terpolymer is an ethylene-ester copolymer modified with a carboxylic acid or carboxylic acid anhydride.

24. The method of claim 22, wherein the adhesive is a terpolymer, wherein the ethylene, the ester, and the carboxylic acid or acid anhydride are incorporated in a main chain of the terpolymer.

25. The method of claim 1, wherein the cap film is free of a silicone fluid.

26. A multilayer film, comprising:
   (a) a core layer comprising a polypropylene film monoaxially oriented in a first direction;
   (c) at least one multilayer cap film provided on said core layer to provide a multilayer film, said cap film comprising:
       (i) a non-crystallizable, amorphous polyester layer comprising a sufficient proportion of a non-crystallizable, amorphous polyester to render said amorphous polyester layer non-crystallizable; and
       (ii) a first tie layer interposed between said polyester layer and said core layer, said first tie layer comprising an adhesive; and,
   (d) said multilayer film oriented in a second direction transverse to said first direction.

* * * * *

UNITED STATES PATENT AND TRADEMARK OFFICE
CERTIFICATE OF CORRECTION

PATENT NO.     : 6,872,458 B1
DATED          : March 29, 2005
INVENTOR(S)    : Rudd et al.

It is certified that error appears in the above-identified patent and that said Letters Patent is hereby corrected as shown below:

Title page,
Item [*] Notice, after "35 U.S.C. 154(b)" please delete "by 0 days" and add -- by 22 days -- in its place.

Signed and Sealed this

Twenty-first Day of June, 2005

JON W. DUDAS
*Director of the United States Patent and Trademark Office*